(12) United States Patent
Chen et al.

(10) Patent No.: US 12,218,953 B2
(45) Date of Patent: *Feb. 4, 2025

(54) BINDING CRYPTOGRAM WITH PROTOCOL CHARACTERISTICS

(71) Applicant: Visa International Service Association, San Francisco, CA (US)

(72) Inventors: Yuexi Chen, Foster City, CA (US); Marc Kekicheff, Foster City, CA (US); Mustafa Top, San Ramon, CA (US); Hao Ngo, San Jose, CA (US)

(73) Assignee: Visa International Service Association, San Francisco, CA (US)

( * ) Notice: Subject to any disclaimer, the term of this patent is extended or adjusted under 35 U.S.C. 154(b) by 120 days.

This patent is subject to a terminal disclaimer.

(21) Appl. No.: 17/838,561

(22) Filed: Jun. 13, 2022

(65) Prior Publication Data

US 2022/0311779 A1 Sep. 29, 2022

Related U.S. Application Data

(63) Continuation of application No. 16/348,085, filed as application No. PCT/US2018/014020 on Jan. 17, 2018, now Pat. No. 11,394,721.

(Continued)

(51) Int. Cl.
*G06Q 20/40* (2012.01)
*G06Q 20/38* (2012.01)
(Continued)

(52) U.S. Cl.
CPC ......... *H04L 63/12* (2013.01); *G06Q 20/3821* (2013.01); *G06Q 20/4018* (2013.01);
(Continued)

(58) Field of Classification Search
CPC ... H04L 63/12; H04L 9/3247; H04L 2209/56; H04L 2209/80; H04L 63/1441;
(Continued)

(56) References Cited

U.S. PATENT DOCUMENTS 4,839,504 A 6/1989 Nakano
2004/0123129 A1 6/2004 Ginter et al.
(Continued)

FOREIGN PATENT DOCUMENTS

CN 101918963 A 12/2010
CN 102065148 A 5/2011
(Continued)

OTHER PUBLICATIONS

EMV integrated circuit card specifications for payment systems, Book 3, Application Specification, Version 4.3, Nov. 2011 (Year: 2011).*

(Continued)

*Primary Examiner* — Duan Zhang
(74) *Attorney, Agent, or Firm* — Kilpatrick Townsend & Stockton LLP

(57) ABSTRACT

A method is disclosed. The method includes generating, by a communication device during an interaction with an access device, a cryptogram using transaction level data and interoperability level data; transmitting the transaction level data and interoperability level data to the access device; and transmitting the cryptogram the access device, wherein the access device or a remote server computer in communication with the access device validates the received cryptogram before allowing the transaction to proceed.

20 Claims, 8 Drawing Sheets

Related U.S. Application Data

(60) Provisional application No. 62/447,260, filed on Jan. 17, 2017.

(51) Int. Cl.
*H04L 9/40* (2022.01)
*H04W 12/106* (2021.01)
*H04W 12/122* (2021.01)

(52) U.S. Cl.
CPC ........ *G06Q 20/409* (2013.01); *H04W 12/106* (2021.01); *H04W 12/122* (2021.01)

(58) Field of Classification Search
CPC .......... H04L 2463/102; H04L 63/0428; G06Q 20/3821; G06Q 20/4018; G06Q 20/409; H04W 12/106; H04W 12/122
See application file for complete search history.

(56) References Cited

U.S. PATENT DOCUMENTS

| | | | |
|---|---|---|---|
| 2006/0144943 A1* | 7/2006 | Kim | G06K 7/10079 235/451 |
| 2008/0082452 A1 | 4/2008 | Wankmueller et al. | |
| 2012/0095911 A1 | 4/2012 | Ibasco et al. | |
| 2014/0101734 A1 | 4/2014 | Ronda et al. | |
| 2014/0189359 A1 | 7/2014 | Marien et al. | |
| 2015/0019442 A1* | 1/2015 | Hird | H04W 12/041 726/30 |
| 2015/0046715 A1 | 2/2015 | Ignatchenko | |
| 2015/0073995 A1 | 3/2015 | Hayhow et al. | |
| 2015/0339664 A1 | 11/2015 | Wong et al. | |
| 2016/0019533 A1 | 1/2016 | Wu et al. | |
| 2016/0036790 A1* | 2/2016 | Shastry | G06Q 20/32 713/168 |
| 2016/0065370 A1 | 3/2016 | Le Saint et al. | |
| 2016/0092879 A1 | 3/2016 | Lasersohn | |
| 2016/0307186 A1 | 10/2016 | Noë et al. | |
| 2016/0379203 A1 | 12/2016 | Elhaoussine et al. | |
| 2017/0200149 A1 | 7/2017 | Antunovic et al. | |
| 2017/0286663 A1 | 10/2017 | Hurry et al. | |
| 2017/0347221 A1 | 11/2017 | Ward et al. | |
| 2018/0268403 A1 | 9/2018 | Guglani | |

FOREIGN PATENT DOCUMENTS

| | | |
|---|---|---|
| CN | 104424410 A | 3/2015 |
| CN | 105610780 A | 5/2016 |
| CN | 106056726 A | 10/2016 |
| EP | 2463797 A1 | 6/2012 |
| GB | 2462648 A | 2/2010 |
| WO | 2012065266 A2 | 5/2012 |
| WO | 2016134016 A1 | 8/2016 |
| WO | WO-2017063114 A1 * | 4/2017 |

OTHER PUBLICATIONS

CN201880006368.5, "Office Action", Nov. 30, 2022, 11 pages.
"EMV Contactless Communication Protocol Specification", Book D, Version 2.6, Available Online at: https://www.emvco.com/wp-content/uploads/2017/04/D_EMV_Contactless_Communication_Protocol_v2.6_20160301114325655.pdf, Mar. 2016, 249 pages.
"EMV Integrated Circuit Card Specifications for Payment Systems", EMV, Version 4.3a, Nov. 2015, 244 pages.
U.S. Appl. No. 16/348,085 , "Final Office Action", filed Mar. 12, 2021, 28 pages.
U.S. Appl. No. 16/348,085 , "Final Office Action", filed Mar. 13, 2020, 38 pages.
U.S. Appl. No. 16/348,085 , "Non-Final Office Action", filed Nov. 27, 2019, 24 pages.
U.S. Appl. No. 16/348,085 , "Non-Final Office Action", filed Nov. 24, 2020, 28 pages.
U.S. Appl. No. 16/348,085 , "Non-Final Office Action", filed Nov. 9, 2021, 41 pages.
U.S. Appl. No. 16/348,085 , "Notice of Allowance", filed Mar. 11, 2022, 11 pages.
U.S. Appl. No. 16/348,085 , "Supplemental Notice of Allowability", filed Mar. 31, 2022, 3 pages.
CAO , "High Frequency RFID Technology Advanced Tutorial", Apr. 2012, 10 pages.
CN201880006368.5 , "Office Action", Nov. 29, 2021, 16 pages.
CN201880006368.5 , "Office Action", Apr. 29, 2022, 17 pages.
CN201880006368.5 , "Office Action", Jun. 28, 2021, 18 pages.
EP18742106.0 , "Extended European Search Report", Dec. 5, 2019, 8 pages.
EP18742106.0 , "Office Action", Nov. 19, 2021, 4 pages.
PCT/US2018/014020 , "International Preliminary Report on Patentability", Aug. 1, 2019, 8 pages.
PCT/US2018/014020 , "International Search Report and Written Opinion", May 4, 2018, 16 pages.
CN201880006368.5 , "Notice of Decision to Grant" , Apr. 15, 2023, 6 pages.
EP23164130.9 , "Extended European Search Report" , May 10, 2023 , 10 pages.
Van Den Breekel, "A Security Evaluation and Proof-of-Concept Relay Attack on Dutch EMV Contactless Transactions" , https://www.cs.bham.ac.uk/~tpc/Relay/thesisJordi.pdf, Oct. 25, 2014 , 180 pages.

* cited by examiner

BINDING CRYPTOGRAM WITH PROTOCOL CHARACTERISTICS

CROSS-REFERENCES TO RELATED APPLICATIONS

This application is a continuation of U.S. application Ser. No. 16/348,085, which is the U.S. National Phase of PCT Application No. PCT/US2018/014020 filed Jan. 17, 2018, which is a non-provisional of and claims the benefit of the priority of U.S. provisional application No. 62/447,260, filed on Jan. 17, 2017, which are herein incorporated by reference in its their entirety for all purposes.

BACKGROUND

Relay attacks are possible in contact and contactless access transactions such as payment transactions. For example, FIG. 1 shows a victim's contactless card 40 that may be remotely located relative to a contactless terminal 10 at a resource provider such as a merchant.

Although the contactless card 40 and the contactless terminal 10 are very far apart in this example, an attacker (e.g., two people working together to steal information or defraud legitimate users) can use two NFC (near field communications) enabled phones 20, 30, and two smartphone applications 20A, 30A on the NFC enabled phones 20, 30 to conduct a relay attack. In a typical relay attack, the attacker uses phone A 30 with an NFC reader mode application to tap and communicate with the contactless card 40 in the victim's pocket. The attacker can use phone B 20 with an application 20A, to tap and communicate with a contactless terminal 10 at a merchant or other resource provider. The two applications 20A, 30A on the two phones 20, 30 are connected through the mobile Internet 50.

Command messages issued by the contactless terminal 10 are relayed from phone B 20 to phone A 30, and are then received by the victim's contactless card 40. The victim's contactless card 40 then responds to the command messages. Access information on the card 40 (e.g., payment information such as a primary account number (PAN)) can then be relayed from phone A 30 to phone B 20, and then to the contactless terminal 10. By performing such a relay attack, the attacker can conduct an access transaction (e.g., a purchase transaction) using the victim's contactless card 40 without taking victim's card 40 from his/her possession. Although this particular example is one which involves a merchant, it is understood that this problem can exist in other situations where access to a resource is desired (e.g., an attempt to access a building, or an attempt to access data inside of a computer).

As shown above, data between two legitimate devices (the contactless terminal 10 and the contactless card 40) are transferred without any change (or with a minimal change). There is a need for an attack recognition mechanism that can address this problem, preferably without substantially changing existing access transaction infrastructures.

Embodiments of the invention address these and other problems.

BRIEF SUMMARY

Embodiments of the invention can address the above problem and other problems.

One embodiment of the invention includes a method including generating, by a communication device during an interaction with an access device, a cryptogram using transaction level data and interoperability level data; transmitting the transaction level data and interoperability level data to the access device; and transmitting the cryptogram to the access device, wherein the access device or a remote server computer in communication with the access device validates the received cryptogram before allowing the interaction to proceed.

Another embodiment of the invention is directed to a communication device comprising: a data processor; and a non-transitory computer readable medium coupled to the data processor. The non-tangible computer readable medium comprises code executable by the data processor for performing a method comprising generating, during an interaction with an access device, a cryptogram using transaction level data and interoperability level data, transmitting the transaction level data and interoperability level data to the access device, and transmitting the cryptogram to the access device, wherein the access device or a remote server computer in communication with the access device validates the received cryptogram before allowing the transaction to proceed.

Another embodiment of the invention is directed to a method comprising: providing, by an access device, transaction level data to a communication device, in an interaction between the access device and the communication device; receiving, by the access device from the communication device, and a cryptogram generated using the transaction level data and interoperability level data; and generating an authorization request message comprising the transaction level data; and transmitting the authorization request message to an authorizing entity computer, wherein the authorizing entity computer approves or declines the authorization request message.

These and other embodiments of the invention are described in further detail below.

DETAILED DESCRIPTION

Figure 1:
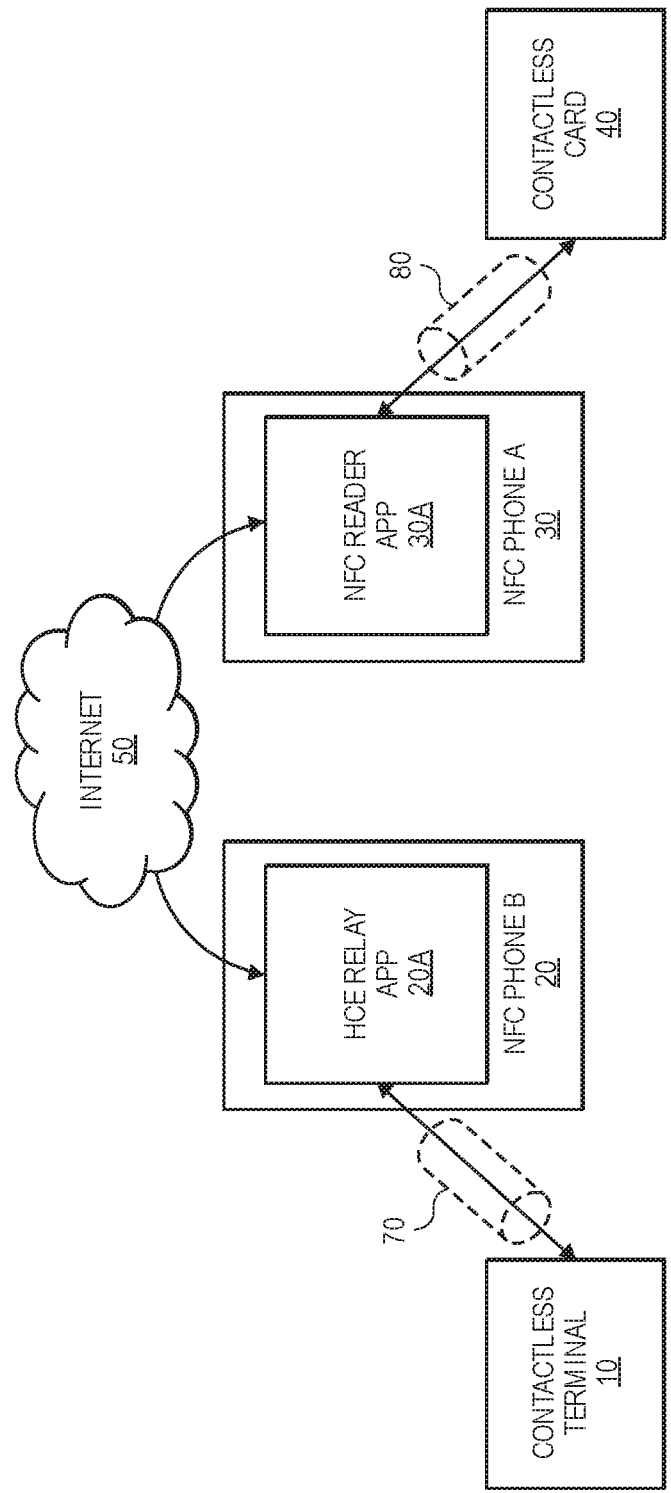
FIG. 1 shows a diagram of a system illustrating a relay attack.

Embodiments of the invention bind interoperability level data such as communication protocol characteristics in a cryptogram in an interaction between a communication device and an access device. The communication device may generate the cryptogram, which encodes interoperability level data with transaction level data. After the cryptogram is generated, the communication device may then send it to an access device such as a contactless terminal for validation (i.e., verification). Once received, the cryptogram can be validated by the access device or a remote server computer in communication with the access device.

The cryptogram can be used in any suitable process. For example, the cryptogram can be used with any of the following processing techniques: card certificate, DDA (dynamic data authentication), combined DDA, fDDA (fast dynamic data authentication) and Secure Channel.

In embodiments of the invention, the cryptogram can be generated in any suitable manner. For example, a card payment application on a payment card (or other payment device) can add interoperability level data such as protocol characteristics data (one or several as mentioned below) to transaction level data (e.g., PAN, unpredictable number, transaction amount, transaction currency, etc.). The card application then uses one or more cryptographic key(s) to generate the cryptogram from the combined interoperability level data and the transaction level data.

In embodiments of the invention, the cryptogram can be validated in any suitable manner. For example, the access device software can use the interoperability level data such as the protocol (e.g., electrical) characteristics data, the transaction level data, and a cryptographic key corresponding to the cryptographic key used to generate the cryptogram to validate the received cryptogram.

If the cryptogram verification fails, this can mean that the communication device which is proximate to the access device may not have generated the cryptogram and the cryptogram may have been inappropriately relayed.

The interoperability level data may include, for example, a UID (unique identifier) value. In the normal interaction between a communication device such as contactless card and an access device such as a contactless terminal, the UID value is provided by the communication device in response to an anti-collision command sent by the access device to the communication device. The UID value is used by the access device to allow the access device to continue to communicate with the correct communication device, in the event that other communication devices are within the vicinity of the access device. Other communication devices within the vicinity of the access device will not have the UID of the correct communication device.

The transaction level data can include data that can be used by an application on the communication device to perform a transaction. The transaction could be a payment transaction, a data access transaction, a location access transaction, etc. Examples of transaction level data may include a primary account number, payment token, transaction amount, timestamp, resource provider identifier, etc. Transaction level data can originate from an access device (e.g., a transaction amount) or from a communication device (e.g., a primary account number of access token).

Embodiments of the invention can address the above relay attack scenario described in FIG. 1. In the scenario described with respect to FIG. 1, transaction level data such as a transaction amount and/or an account number can be passed between, for example, the contactless card 40 and the access device 102 via the phones 20, 30. However, interoperability level data such as a first UID would be obtained by the contactless terminal 10 from the application 20A or the phone 20 after the phone 20 is proximate to the contactless terminal 10. Interoperability level data would not be received by the contactless card 40. The received first UID would be specific and unique to the application 20A or the phone 20.

In subsequent messaging between the contactless terminal 10 and the contactless card 40, the contactless card 40 will possess information such as an account number and a transaction amount (the latter of which is received from the contactless terminal 10). The contactless card 40 may also generate a cryptogram by signing a second UID value in response to its interaction with the phone 30, and transaction level data such as the account number and/or transaction amount with a first cryptographic key. The first cryptographic key may be an authorizing entity cryptographic key such as an issuer private key. This cryptogram will then be transmitted from the contactless card 40 to the contactless terminal 10 via the phones 20, 30.

The contactless terminal 10 is now in possession of the cryptogram, the first UID, and the transaction level data such as the account identifier and the transaction amount. The cryptogram may be validated by the contactless terminal 10. The contactless terminal 10 may attempt to use the first UID and the transaction level data and a second cryptographic key corresponding to the first cryptographic key to validate the received cryptogram.

In this example, the access device 104 will determine that it cannot validate the received cryptogram, because the cryptogram was formed using the second UID provided by the contactless card 40, and not the first UID provided by the phone 20. As a result, the cryptogram would not be validated and contactless terminal 10 would not allow the transaction to proceed, thereby preventing a relay attack. The application 20A in the phone 20 is not able to change the phone's CLF (contactless front end, i.e., a controller) configuration to change the first UID or prevent the first UID from being sent to the contactless terminal 10.

Embodiments of the invention can be applied to different payment communication protocols, including but not limit to: contact chip (ISO7816), contactless NFC chip (ISO14443), Bluetooth and WiFi. Interoperability level data may include protocol characteristics data including (but not limited to) at least the following types of values: ATR (answer to reset—sequence of bytes sent by a contact smart card in response to a (hardware) reset; the ATR includes various parameters relating to the transmission protocol for the contact smart card complying with ISO/IEC 7816), ATS (the counterpart of ATR for contactless smart cards of Type A complying with ISO/IEC 14443), WUPB (wake up command), UID (unique identifier), UUID (universally unique identifier), PUPI (pseudo unique PICC identifier), and MAC (message authentication code), voltage, current and modulation mode.

Prior to discussing embodiments of the invention, some terms will be described.

A "communication device" may comprise any suitable electronic device that may be operated by a user, which may also provide remote communication capabilities to a network. A "mobile communication device" may be an example of a "communication device" that can be easily transported. Examples of remote communication capabilities include using a mobile phone (wireless) network, wireless data network (e.g. 3G, 4G or similar networks), Wi-Fi, Wi-Max, or any other communication medium that may provide access to a network such as the Internet or a private network. Examples of mobile communication devices include mobile phones (e.g. cellular phones), PDAs, tablet computers, net books, laptop computers, personal music players, hand-held specialized readers, etc. Further examples of mobile communication devices include wearable devices, such as smart watches, fitness bands, ankle bracelets, rings, earrings, etc., as well as automobiles with remote communication capabilities. In some embodiments, a mobile communication device can function as a payment device (e.g., a mobile communication device can store and be able to transmit payment credentials for a transaction).

A "payment device" may include any suitable device that may be used to conduct a financial transaction, such as to provide payment credentials to a merchant. The payment device may be a software object, a hardware object, or a physical object. As examples of physical objects, the payment device may comprise a substrate such as a paper or plastic card, and information that is printed, embossed, encoded, or otherwise included at or near a surface of an object. A hardware object can relate to circuitry (e.g., permanent voltage values), and a software object can relate to non-permanent data stored on a device. A payment device may be associated with a value such as a monetary value, a discount, or store credit, and a payment device may be associated with an entity such as a bank, a merchant, a payment processing network, or a person. Suitable payment devices can be hand-held and compact so that they can fit into a user's wallet and/or pocket (e.g., pocket-sized). Example payment devices may include smart cards, magnetic stripe cards, keychain devices (such as the Speedpass™ commercially available from Exxon-Mobil Corp.), etc. Other examples of payment devices include payment cards, smart media, transponders, and the like. If the payment device is in the form of a debit, credit, or smartcard, the payment device may also optionally have features such as magnetic stripes. Such devices can operate in either a contact or contactless mode.

A "credential" may be any suitable information that serves as reliable evidence of worth, ownership, identity, or authority. A credential may be a string of numbers, letters, or any other suitable characters, as well as any object or document that can serve as confirmation. Examples of credentials include value credentials, identification cards, certified documents, access cards, passcodes and other login information, etc.

"Payment credentials" may include any suitable information associated with an account (e.g. a payment account and/or payment device associated with the account). Such information may be directly related to the account or may be derived from information related to the account. Examples of account information may include a PAN (primary account number or "account number"), user name, expiration date, and verification values such as CVV, dCVV, CVV2, dCVV2, and CVC3 values.

A "token" may be a substitute value for a credential. A token may be a string of numbers, letters, or any other suitable characters. Examples of tokens include payment tokens, access tokens, personal identification tokens, etc.

A "payment token" may include an identifier for a payment account that is a substitute for an account identifier, such as a primary account number (PAN). For example, a payment token may include a series of alphanumeric characters that may be used as a substitute for an original account identifier. For example, a token "4900 0000 0000 0001" may be used in place of a PAN "4147 0900 0000 1234." In some embodiments, a payment token may be "format preserving" and may have a numeric format that conforms to the account identifiers used in existing transaction processing networks (e.g., ISO 8583 financial transaction message format). In some embodiments, a payment token may be used in place of a PAN to initiate, authorize, settle or resolve a payment transaction or represent the original credential in other systems where the original credential would typically be provided. In some embodiments, a payment token may be generated such that the recovery of the original PAN or other account identifier from the token value may not be computationally derived. Further, in some embodiments, the token format may be configured to allow the entity receiving the token to identify it as a token and recognize the entity that issued the token.

A "user" may include an individual. In some embodiments, a user may be associated with one or more personal accounts and/or mobile devices. The user may also be referred to as a cardholder, account holder, or consumer in some embodiments.

A "resource provider" may be an entity that can provide a resource such as goods, services, information, and/or access. Examples of resource providers includes merchants, data providers, transit agencies, governmental entities, venue and dwelling operators, etc.

A "merchant" may typically be an entity that engages in transactions and can sell goods or services, or provide access to goods or services.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

An "authorizing entity" may be an entity that authorizes a request. Examples of an authorizing entity may be an issuer, a governmental agency, a document repository, an access administrator, etc.

An "issuer" may typically refer to a business entity (e.g., a bank) that maintains an account for a user. An issuer may also issue payment credentials stored on a user device, such as a cellular telephone, smart card, tablet, or laptop to the consumer.

An "access device" may be any suitable device that provides access to a remote system. An access device may also be used for communicating with a merchant computer, a transaction processing computer, an authentication computer, or any other suitable system. An access device may generally be located in any suitable location, such as at the location of a merchant. An access device may be in any suitable form. Some examples of access devices include POS or point of sale devices (e.g., POS terminals), cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a mobile communication or payment device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. In some embodiments, a cellular phone, tablet, or other dedicated wireless device used as a POS terminal may be referred to as a mobile point of sale or an "mPOS" terminal.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g. POS equipment) that indicates approval of the transaction. The code may serve as proof of authorization.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "processor" may refer to any suitable data computation device or devices. A processor may comprise one or more microprocessors working together to accomplish a desired function. The processor may include a CPU that comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "secure element" can refer to a component that can perform a function securely. A secure element may be a memory that securely stores data, such that its access is protected. An example of a "secure element" is a Trusted Execution Environment (TEE), a secure area of a processor. Another example of a secure element is a Universal integrated-circuit card (UICC), a secure smart card. Yet another example of a secure element is an embedded secure element, an embedded hardware component in a larger mechanical or electrical system. Another example of a secure element is a hardware security module (HSM), which is a physical computing device that can safeguard and manage cryptographic keys for authentication and provide crypto-processing functions.

An "interaction" may be a reciprocal action of influence. Examples of interactions may include transactions such as payment transactions, data access transactions, and secure location access transactions.

"Interoperability level data" may include electrical and time related characteristics (e.g., for contact transactions) or electromagnetic and time related characteristics (e.g., contactless) and/or logical protocol requirements associated with a communication device. Interoperability level data can include data that is needed to allow a communication device to interact with an access device. Examples of interoperability level data may include "level one data" (as defined by EMV or Europay-MasterCard-Visa) of communication devices and communications involving the communication devices. Interoperability level data may include protocol characteristics including (but not limited to) at least the following values: ATR (answer to reset—sequence of bytes sent by a contact smart card in response to a (hardware) reset; the ATR includes various parameters relating to the transmission protocol for the contact smart card complying with ISO/IEC 7816), ATS (the counterpart of ATR for contactless smart cards of Type A complying with ISO/IEC 14443), WUPB (wake up command), UID (unique identifier), UUID (universally unique identifier), PUPI (pseudo unique PICC identifier), and voltage, current and modulation related parameters.

In some embodiments, interoperability level data can be formatted into a standard format such that the modified format is transaction level data. For example, a hash algorithm can receive interoperability level data as an input, and can generate 4~8 bytes of interoperability level data as an output. As an illustration, a tag can be assigned for interoperability level data as illustrated below.

E.g.
   ATR=3b9f96c00a3fc6a08031e073fe211f65d0021b11d2810f99
   Left(SHA1(ATR), 4)=30fdea21
   Tag 9Fxx 04 30fdea21

In the above example, 30fdea21 may be an example of interoperability level data, but the entire tag may be considered transaction level data.

"Transaction level data" may be characterized as "level two data" (as defined by EMV or Europay-MasterCard-Visa) in some instances, and can relate to application layer data. Application layer data can relate to characteristics such as payment application selection and financial transaction processing. Transaction level data is not necessary for an access device to interact with a communication device, but can allow a communication device and an access device to complete a transaction. Examples of transaction level data may include a PAN or token, an unpredictable number, CVV, dCVV, a transaction amount, and a transaction currency code.

In some embodiments of the invention, the communication device can be personalized with certificates (or cryptograms). The card certificate can't be re-generated without knowing the appropriate interoperability level data. For example, in some embodiments, a specific ATS/WUPB response can be bound to a batch of communication devices (e.g., cards), or a specific UID/PUPI response may be bound to a single card.

In some embodiments, interoperability level data may be used in offline authentication. Interoperability level characteristics may be included in an offline authentication process such as a card offline authentication process (e.g., DDA/CDA/fDDA). A communication device can sign the interoperability level data with transaction level data using a card private key during a transaction to form Signed Dynamic Application Data (SDAD). The SDAD may be validated with interoperability level data characteristics. The contactless terminal can make sure that the communication device that it is communicating with has legitimate transaction level and interoperability level data.

In a specific process, SDAD generated by card private key will now sign both transaction level data (e.g., transaction amount, currency code, etc.) and interoperability level data. Relaying only the transaction level data by the communication device to the access device will result in an SDAD validation failure. It is noted that a smartphone HCE (host card emulation) application is not able to change the phone's CLF configuration.

In embodiments of the invention, the contactless card can support offline authentication (DDA/CDA/fDDA). The card application can have access to interoperability level data from personalization, or from an API call during a transaction. Interoperability level data can be provided to a payment application (e.g., EMV or Europay MasterCard, and Visa) kernel for card validation by an access device such as a contactless terminal.

Figure 2:
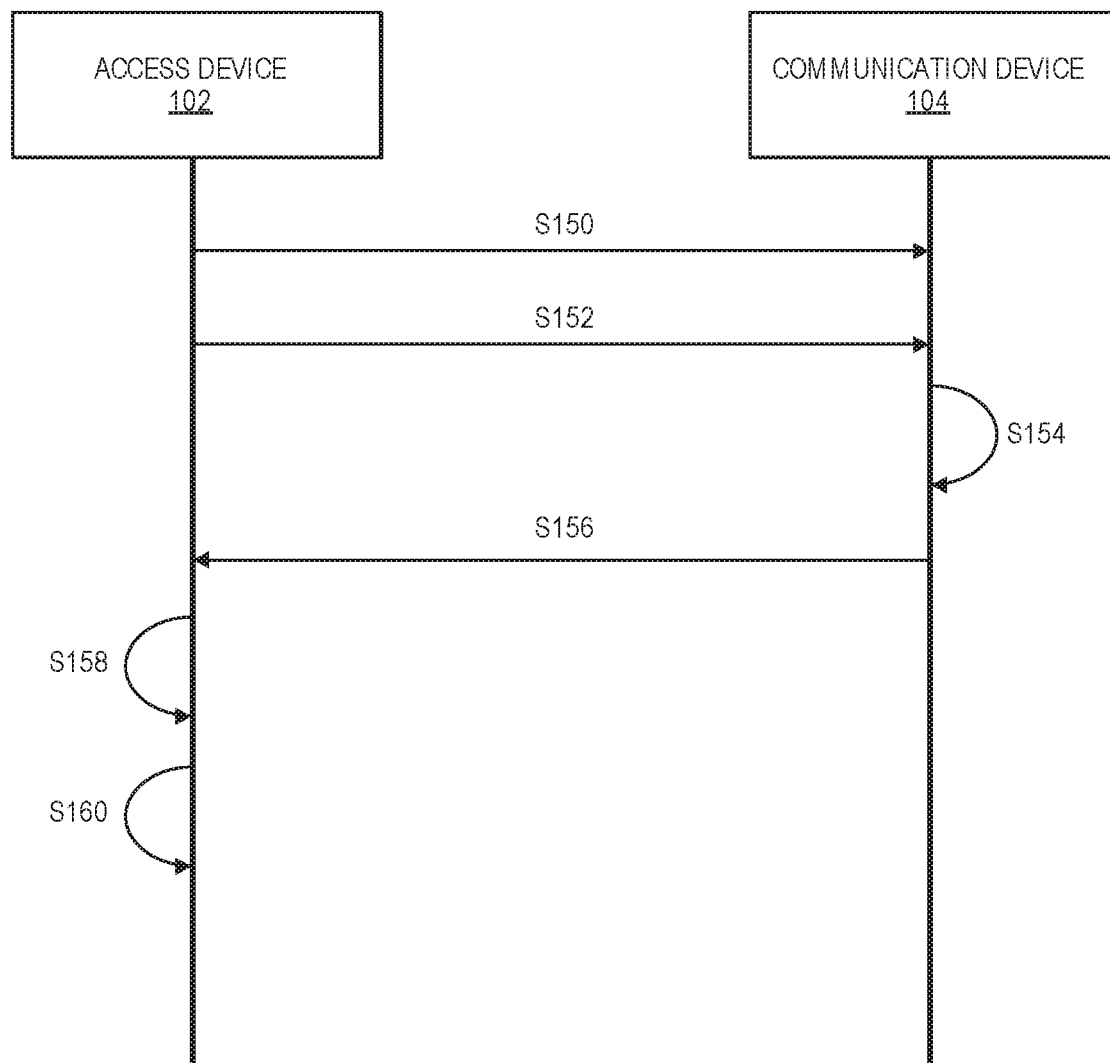
FIG. 2 shows a block diagram of a system including an access device and a communication device, and a method that can be performed in the illustrated system.

FIG. 2 shows a system and a flow diagram illustrating interactions between an access device 102 and a communication device 104. The communication device 104 may be a mobile phone or a contactless card, while the access device 102 may be a contactless terminal with a communication device reader. The access device 102 and the communication device 104 may communicate with each other via short range communication process or technology (e.g., Bluetooth, Wi-Fi, NFC, etc.).

In step S150, a transaction may be initiated by a series of communications between the access device 102 and the communication device 104. For example, in one embodiment, an anti-collision command may be sent from the access device 102 to the communication device 104 in a contactless interaction. The communication device 104 may respond with a UID or a PUPI. In another example, a reset action may be implemented from the access device 102 to the communication device 104 in a contact interaction. The communication device 104 may respond with an ATR value. In these examples, the UID, PUPI, and ATR values can examples of interoperability level data that can only be provided by the communication device 104 to the access device 102. These or other subject values can be fixed or randomized generated each time the interaction is initiated.

In step S152, the access device 102 may transmit an information request to the communication device 104. The information request may contain certain data elements from the access device 102. Such data elements may include a transaction amount, an access device identifier, a resource provider identifier, an unpredictable number, etc.

In step S154, the communication device 104 may generate a cryptogram as described above. After generating the cryptogram, the communication device 104 may provide the cryptogram to the access device 102. Additional data elements which may be transaction level data may be included in the response in step S156. For example, a primary account number, CVV, etc. may be transmitted to the access device 104 by the communication device 102 in step S156.

In step S158, the access device 102 may validate the cryptogram. In some embodiments, the access device 102 may obtain the interoperability level data and the transaction level data and may obtain transaction level data from the communication device 104. For example, the interoperability level data may be obtained in step S150 or step S156. In some embodiments, the cryptogram could be decrypted with a cryptographic key to obtain the interoperability level data and the transaction level date. This data may be compared to the determined interoperability level data and transaction level data to determine if there is a match. In other embodiments, a separate cryptogram may be calculated by the access device 102 (using the obtained interoperability level data and the transaction level data, and an appropriate cryptographic key) and this may be compared with the received cryptogram to determine if there is a match. In this example, the separate cryptogram may be generated using a symmetric key, and a corresponding symmetric key may be on the communication device and may have been used to generate the received cryptogram. In yet other embodiments, the received cryptogram was generated using a private key of a public/private key pair. The received cryptogram can be validated with a public key, a verification algorithm, the interoperability level data, and the transaction level data. Public key verification methods are known in the art.

If the cryptogram is validated, then the access device 102 may allow the transaction to proceed. If the cryptogram is not validated, then the access device 102 may not allow the transaction to proceed.

Figure 3:
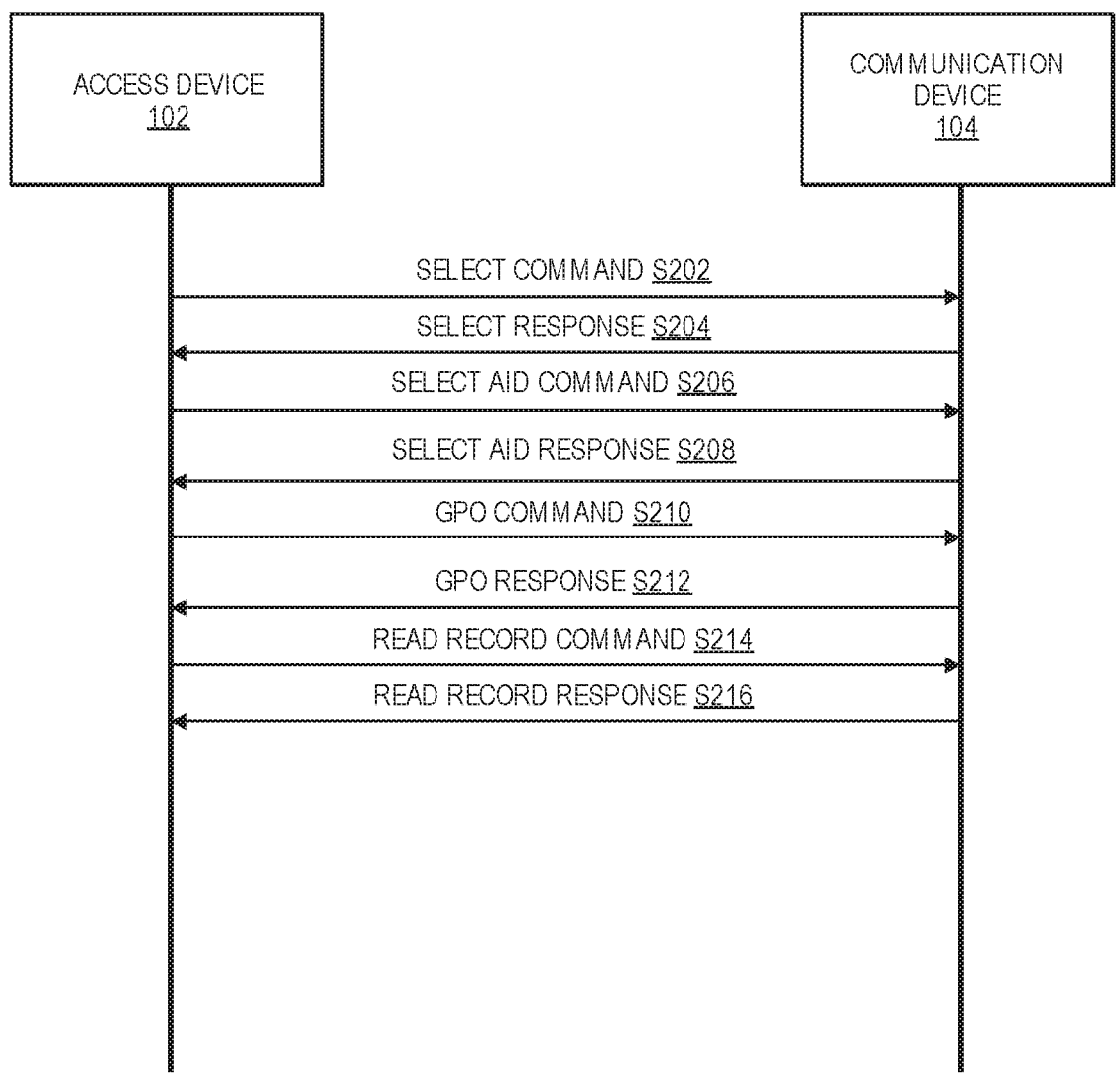
FIG. 3 shows a block diagram of a system including an access device and a communication device, and descriptions of exemplary command messages and responses that may be transmitted between the access device and the communication device.

FIG. 3 shows a flow diagram illustrating more detailed interactions between an access device 102 and a communication device 104 in a payment transaction.

In step S202, when the access device 102 detects a presence of the communication device 104, a select command is sent from the access device 102 to the communication device 104. The select command may be a select PPSE command, which can be used to identify the payment environment supported by the access device 102 and the communication device 104. The command may also include information regarding which payment application(s) (e.g., a list of AID(s)) may be available on the communication device 104

Upon receiving the command in S202, the communication device 104 may include an application which may identify and process the request by recognizing the payment environment identifier (e.g., PPSE name) included in the request, and respond by sending an available applications response S204 back to access device 102. The available applications response S204 may include a list of available AIDs, and may include the payment environment identifier (e.g., PPSE name). In some embodiments, the available applications response S204 may be in the form of a select PPSE response and may include PPSE file control information (FCI).

When the access device 102 receives the available applications response S204, the access device 102 selects a suitable application from the list of applications received in the available applications response S204 (e.g., by selecting an AID from the available AID(s) received in the available application(s) response S204). In some cases, the selected AID can be the highest priority AID available that is supported by access device 102. Access device 102 may send an application selection with the selected AID to the application on the communication device 104. In some embodiments, the application selection can be in the form of a select AID command S206.

Upon receiving the application selection, the application of the communication device 104 may send a terminal transaction data request to request transaction data from access device 102 which may be needed to execute the transaction using the selected application/AID. In some embodiments, the terminal transaction data request may be in the form of a select AID response S208 and may include AID file control information (FCI) with the selected AID as a dedicated file name. The terminal transaction data request may include a list of transaction data identifiers to request the appropriate data from access device 102, and the list of transaction data identifiers can be in the form of a processing options data object list (PDOL). The transaction data requested by the application on the communication device 104 may include terminal transaction qualifiers (TTQ), an authorized amount, other amount, terminal country code, terminal verification results, transaction currency code, transaction data, transaction type, and/or an unpredictable number. The terminal transaction data request may also include other data such as the FCI issuer discretionary data, application program identifier, and language preference. These data elements may be considered transaction level data.

After receiving the terminal transaction data request, access device 102 may send, to the application of the communication device 104, the terminal transaction data requested by the mobile application. In some embodiments, the terminal transaction data may be sent in the form of a get processing options (GPO) command S210, and may include the requested terminal transaction data in a processing options data object list (PDOL). In some embodiments, the terminal transaction data (e.g., terminal transaction qualifiers (TTQ)) may include a transaction type indicator indicating whether access device 102 supports integrated chip based transactions or magnetic stripe based transactions. Thus, in the chip based transaction illustrated in FIG. 3, access device 102 may send a transaction type indicator in the terminal transaction data to indicate that access device 102 supports integrated chip based transactions. In some embodiments, the terminal transaction data (e.g., terminal transaction qualifiers (TTQ)) may also include a consumer verification method (CVM) requirement indicator to indicate whether a CVM is required by access device 102, and also CVM type indicators indicating the types of CVM supported by access device 102. Examples of CVMs that may be supported by access device 102 can include online PIN, signature, and/or consumer device CVM (CDCVM) such as a passcode used on communication device 104.

Once the application of the communication device 104 receives terminal transaction data, the application may increment its Application Transaction Counter (ATC), generate dynamic transaction processing information using at least some of the received terminal transaction data, and send a set of transaction processing information including the generated dynamic transaction processing information to access device 102. In some embodiments, the transaction processing information can be sent in the form of a GPO response S212. In some embodiments, the transaction processing information may include one or more application file locators (AFLs) that can be used as file address(es) by access device 102 to read account data stored on communication device 104, and an application interchange profile (AIP) that can be used to indicate the capabilities of the application.

For an integrated chip based transaction, according to some embodiments, the transaction processing information may include a transaction cryptogram dynamically generated using a LUK (a cryptographic, limited use key), track-2 equivalent data, and additional data such as issuer application data (IAD), form factor indicator (FFI), card transaction qualifiers (CTQ), cryptogram information data (CID), the updated ATC, and/or an application PAN sequence number (PSN). In some embodiments, the issuer application data (IAD) may include a length indicator indicating the length of the IAD, cryptogram version number (CVN) indicating the version of the transaction cryptogram, a derived key indicator (DKI) that can be used to identify a master key (e.g. a master key associated with the issuer used in generation of the LUK), card verification results (CVR), a wallet provider ID, and/or derivation data such as the key index that was used in the generation of the LUK. This cryptogram may be token cryptogram that is used to validate a payment token that is accompanied with it. A payment processor may receive the payment token and the token cryptogram. If the token cryptogram is valid, then the payment token is also valid. The above-described interoperability data could be, but does not need to be, included in the token cryptogram.

The card verification results (CVR) may include information about the CVM verifying entity and the CVM verified type for the transaction. The CVM verifying entity is used to indicate which entity is performing the verification of the CVM for the transaction. The verification entity may be the access device (or terminal), a co-residing secure application, a trusted execution environment application, the application on the communication device 104, a remote server (e.g., the cloud), etc. The CVM verified type is used to indicate the CVM method used for the transaction. The CVM method may be a passcode, biometric (e.g., fingerprint), pattern lock (e.g., for a screen lock), signature, or online PIN.

If the terminal transaction data received from the access device 102 indicates that a CVM is not required, the CVM verifying entity and the CVM verified type can be set to indicate that no CVM was verified. In some embodiments, the CVR may include additional data such as a threshold indicator that indicates whether one or more limited-use thresholds associated with the LUK have been exceeded.

The form factor indicator (FFI) may include information about communication device 104. The form factor indicator (FFI) may indicate that communication device 104 is a standard card (e.g., ID-1 card type as specified in ISO 7811), a mini-card, a non-card form factor (e.g., key fob, watch, wristband, ring, sticker, etc.), or a mobile phone. The consumer payment device features indicators may indicate whether communication device 104 is capable of using a passcode (can be separate from a PIN that is used during transactions), has a signature panel, has a hologram, has support for card verification values (e.g., CVV2), is capable of two-way messaging to exchange identifying information between the issuer and the user, and/or has support for using cloud-based credentials (e.g., LUK, token, etc.). The form factor indicator (FFI) may also include a payment transaction technology indicator indicating that communication device 104 supports contactless transactions (e.g., NFC).

After the access device 102 receives the transaction processing information, the access device 102 may send an account data request to the application of communication device 104 to read additional account data that may be stored on communication device 104. In some embodiments, the account data request may be in the form of a read record command S214, and may include an application file locator (AFL) indicating the address or location of the account data that access device 102 is attempting to read. The AFL included in the account data request may correspond to an AFL in the transaction processing information provided from communication device 104.

In response to receiving the account data request from access device 102, communication device 104 may send the account data stored at the location indicated by the AFL to access device 102. In some embodiments, the account data may be sent in the form of a read record response S216. The account data may include, for example, application usage control that indicates the issuer's restrictions on the usage and services allowed for the application, the cardholder's name, account number, payment token, customer exclusive data, issuer country code, token requester ID (e.g., if a token is used), and/or other account related data that is accessible at the AFL location.

Once the access device 102 has received the requisite data from the transaction processing information and/or one or more account data transmissions, some or all of the data elements in the transaction processing information and/or one or more account data transmissions can be used by access device 102 to generate a transaction authorization request message to request authorization of the transaction from the issuer. For example, in some embodiments, the transaction authorization request message may include at least the track-2 equivalent data and the transaction cryptogram generated with the LUK, and the transaction can be authorized based on at least verifying that the transaction cryptogram was generated correctly and that the LUK used in generation of the transaction cryptogram has not exhausted the LUK's set of one or more limited use thresholds.

It is noted that the interoperability level data and/or transaction level data, as well as the cryptogram that is formulated using the interoperability level data and the transaction level data may be transmitted in any of the transmissions from the communication device 104 to the access device 102 as described above with respect to FIG. 3 (or they may be sent in other data transmissions not shown in FIG. 3). For example, the cryptogram may be transmitted from the communication 104 to the access device 102 in step S212 or Step S216 in FIG. 3. The access device 102 or a server computer in communication with the access device 102 can validate the cryptogram to determine if the transaction should or should not proceed.

Figure 4:
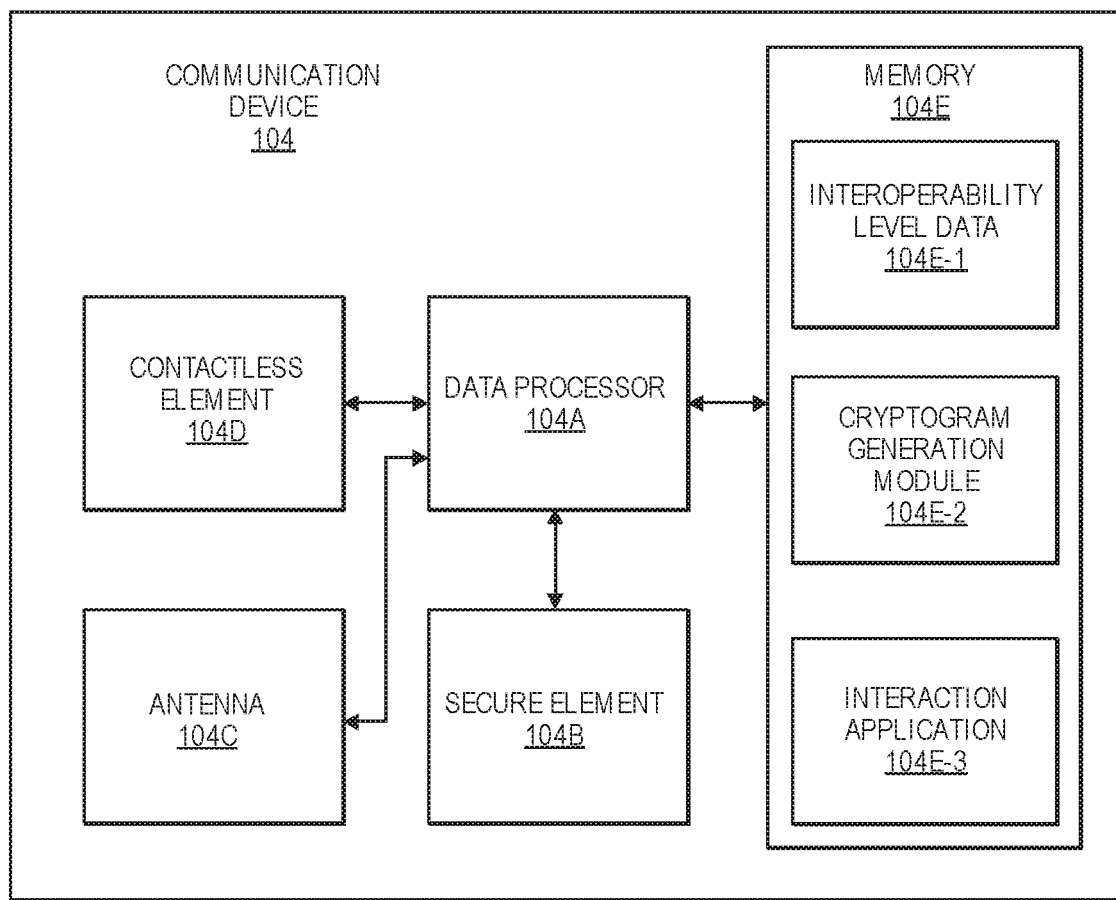
FIG. 4 shows a block diagram of a communication device according to an embodiment of the invention.

FIG. 4 shows a block diagram of a communication device 104 according to an embodiment of the invention. The communication device 104 may be in the form of a phone, or it may be in the form of a card.

The communication device 104 may include a number of components including, but not limited to a data processor 104A, as well as a secure element 104B, a computer readable medium 104B, an antenna 104C, a contactless element 104D, and a memory 104E, each operatively coupled to the data processor 104A. The memory 104E may comprise interoperability level data 104E-1. The memory 104E may also comprise a computer readable medium comprising a cryptogram generation module 104E-2 and an interaction application 104E-3.

The secure element 104B may store sensitive data such account identifiers, as well as cryptographic keys that may be used to create the above-described cryptograms. Details regarding secure elements are provided above. Further, some embodiments of the invention need not include a secure element.

The antenna 104C may be a long range antenna that allows the communication device 104 to communicate with a remote server computer via a network such as a cellular network.

The contactless element 104D may include a short range antenna and a one or more computer chips. The contactless element 104D may allow the communication device 104 to communicate with an access device via a short range communication mode such as NFC, Bluetooth, or Wi-Fi.

The cryptogram generation 104E-2 in the memory 104 may include code executable by the data processor 104A to generate a cryptogram as described above. Any suitable encryption technique may be used including DES, triple DES, AES, etc.

The interaction application 104E-3 may include code, executable by the data processor 104A to allow the communication device 104 to communicate with the external access device or other device. For example, the interaction application 104E-3 may include code, executable by the data processor 104A, to perform the function of the communication device 104 described above with respect to FIG. 3.

The memory 104E may also comprise a computer readable medium that comprises code, executable by the processor 104A to perform a method comprising: generating, by a communication device during an interaction with an access device, a cryptogram using transaction level data and interoperability level data; transmitting the transaction level data and interoperability level data to the access device; and transmitting the cryptogram to the access device, wherein the access device or a remote server computer in communication with the access device validates (by verifying) the received cryptogram before allowing the transaction to proceed.

Figure 5:
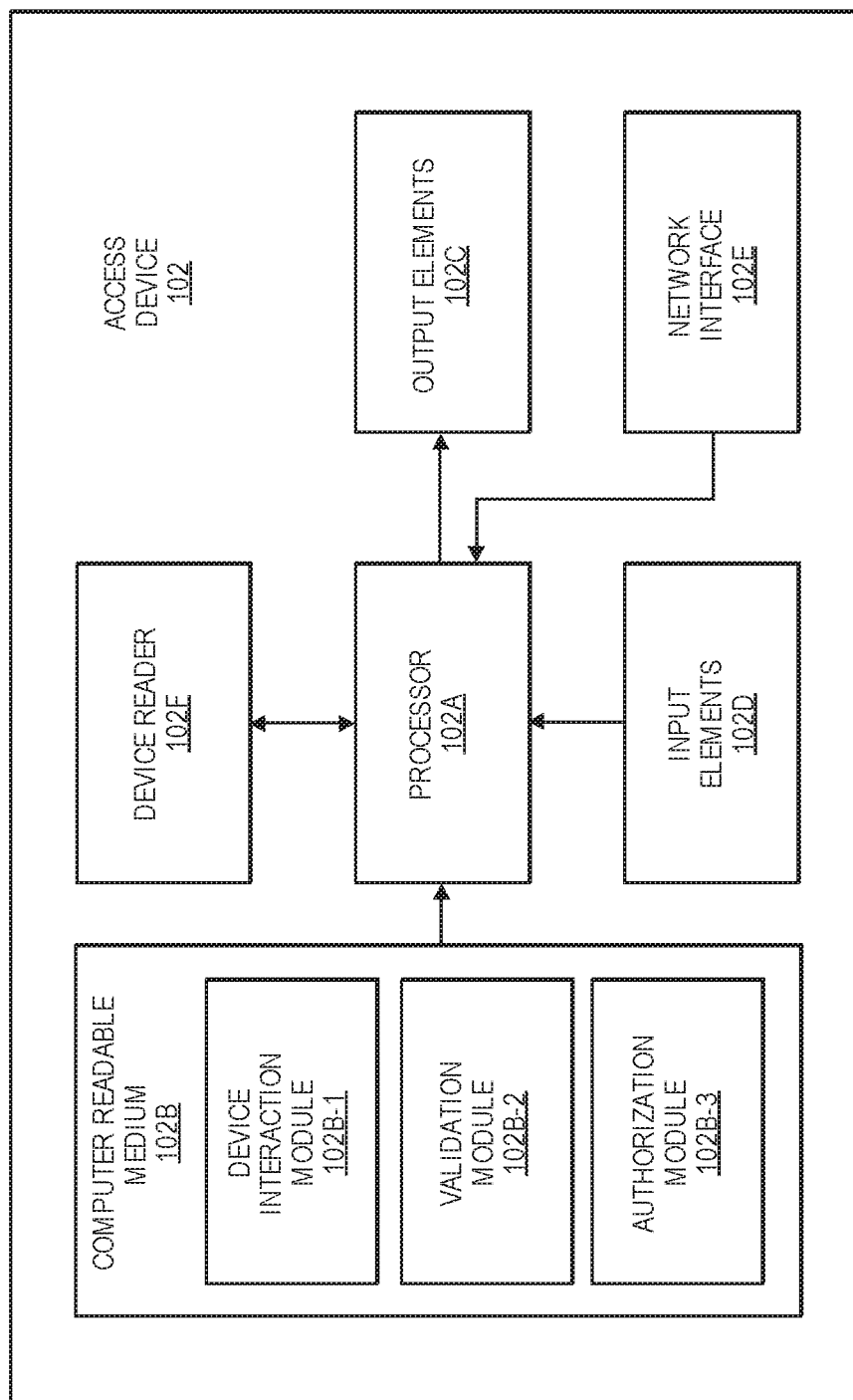
FIG. 5 shows a block diagram of an access device according to an embodiment of the invention.

FIG. 5 shows a block diagram of an access device 102 according to an embodiment of the invention. The access device 102 may comprise a processor 102A. A communication device reader 102F, output elements 102C, a network interface 102E, input elements 102D, and a computer readable medium 102B may be operatively coupled to the processor.

The communication device reader 102F may comprise any suitable device capable of reading, providing, or writing data to or from a communication device. Suitable communication device readers include antennas, electrical contacts, etc.

Output elements 102C may comprise any suitable devices that may output data. Examples of output elements 102C may include display screens, speakers, and data transmission devices.

The network interface 102E may include an interface that can allow the access device 102 to communicate with external computers. Network interface 102E may be any suitable combination of hardware and software that enables data to be transferred to and from the access device 102. Network interface 102E may enable access device 102 to communicate data to and from another device (e.g., resource provider computer, authorization computer, etc.). Some examples of network interface 102E may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by network interface 220 may include Wi-Fi™.

Data transferred via network interface 102E may be in the form of signals which may be electrical, electromagnetic, optical, or any other signal capable of being received by the external communications interface (collectively referred to as "electronic signals" or "electronic messages"). These electronic messages that may comprise data or instructions may be provided between network interface 102E and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

The input elements 102D may include any suitable device capable of inputting data into the access device 102. Examples of input devices include buttons, touchscreens, touch pads, microphones, etc.

The computer readable medium 102B may comprise one or more data storage devices. Such data storage devices may store code or applications which can cause the access device 102 to perform the functions described herein. The computer readable medium 102B may also include a device interaction module 102B-1, a validation module 102B-2, and an authorization module 102B-3.

The device interaction module 102B-1 may comprise computer code, executable by the data processor 102A to allow the access device 102 to communicate with an external device such as a communication device.

The validation module 102B-2 may comprise computer code, executable by the data processor 102A to validate a cryptogram. The validation module 102B-2 working in conjunction with the data processor 102A, can obtain a cryptographic key, interoperability data, and transaction level data and can validate a received cryptogram.

The authorization module 102B-3 may comprise computer code, executable by the data processor 102A to generate and transmit authorization request messages and receive authorization response messages from an authorization computer.

In some embodiments, the computer readable medium 102B may comprise code, executable by the processor 102A for implementing a method comprising: providing, by an access device, transaction level data to a communication device, in an interaction between the access device and the communication device; receiving, by the access device from the communication device, a cryptogram generated using the transaction level data and interoperability level data; and generating an authorization request message comprising the transaction level data; and transmitting the authorization request message to an authorizing entity computer, wherein the authorizing entity computer approves or declines the authorization request message.

Figure 6:
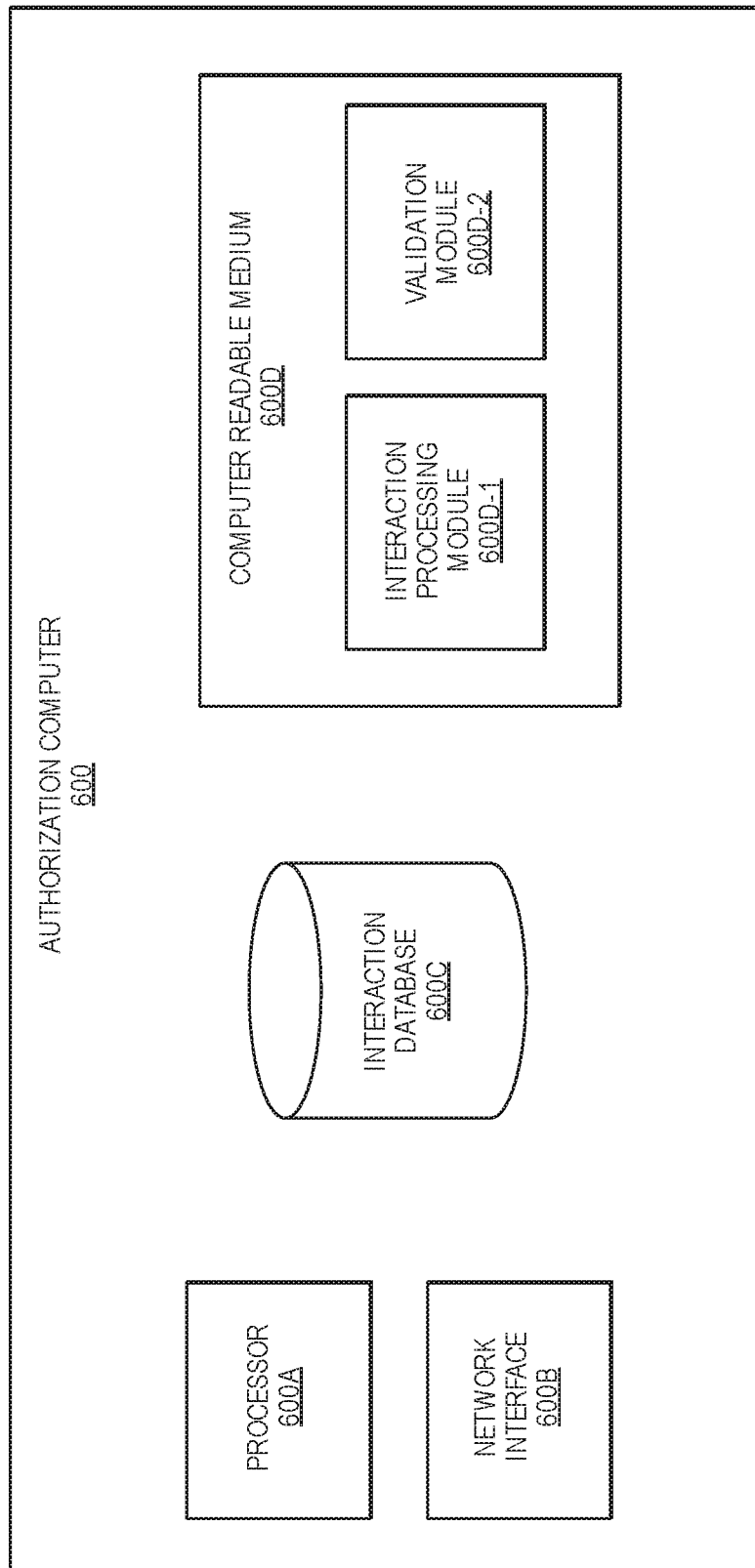
FIG. 6 shows a block diagram of an authorization computer.

FIG. 6 shows a block diagram of an authorization computer 600 according to an embodiment of the invention. The authorization computer 600 may constitute a remote computer in communication with an access device.

The authorization computer 600 may comprise a data processor 600A, a network interface 600B, an interaction database 600C, and a computer readable medium 600D. The computer readable medium 600D may include an interaction processing module 600D-1 (e.g., a transaction processing module) and a validation module 600D-2.

The interaction processing module 600D-1 may include code, executable by the data processor 600A to process transaction level data. Such processing may including performing fraud analyses and determining if authorization request messages should be approved or declined.

The validation module 600D-2 may also validate a cryptogram, and may perform a similar function as the validation module 102B-3 in the access device 102.

Figure 7:
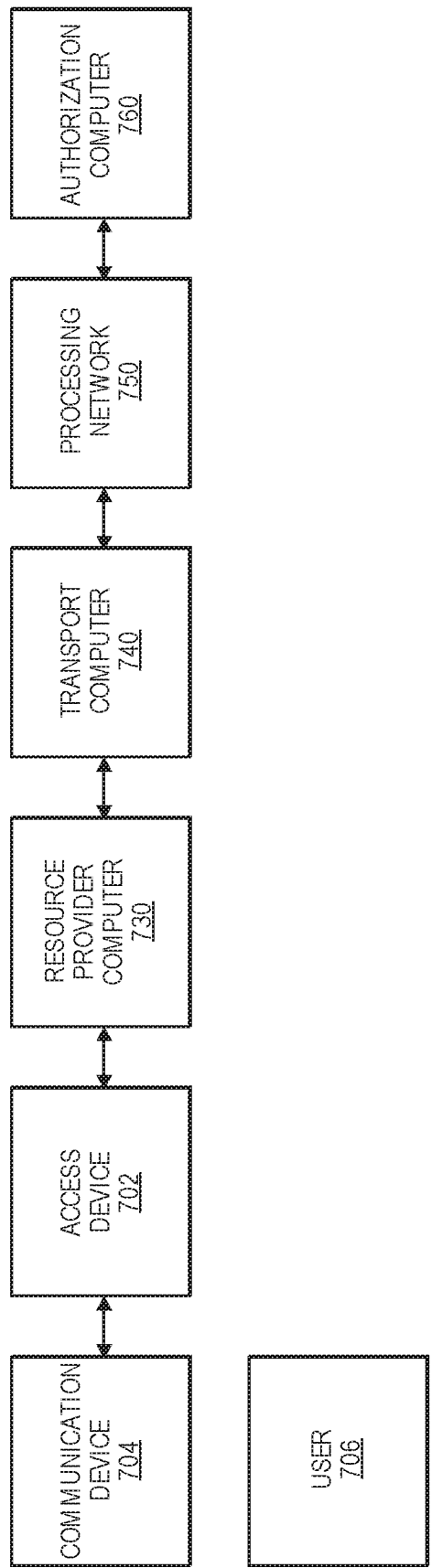
FIG. 7 shows a system diagram illustrating a payment processing system.
Figure 8:
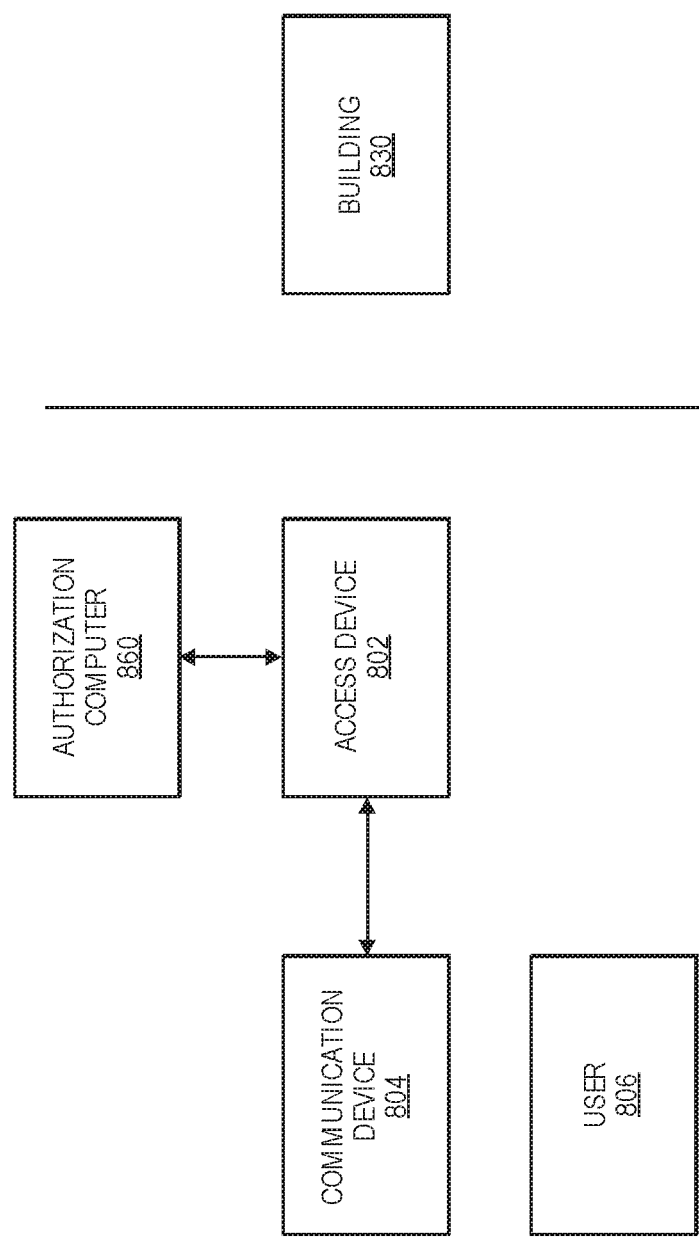
FIG. 8 shows a system diagram including an access device and a building.

FIGS. 7-8 illustrate different situations illustrating the use of a communication device with an access device when attempts are made to access resources such as goods, services, or locations.

FIG. 7 shows a block diagram of a transaction processing system that can use a communication device with access data. FIG. 7 shows a user 706 that can operate a communication device 704. The user 706 may use the communication device 704 to pay for a good or service at a resource provider such as a merchant. The resource provider may operate a resource provider computer 730 and/or an access device 720. The resource provider may communicate with an authorization computer 760 (e.g., an issuer computer) via a transport computer 730 (e.g., an acquirer computer) and a processing network 750 (e.g., a payment processing network).

The processing network 750 may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network may use any suitable wired or wireless network, including the Internet.

A typical payment transaction flow using a communication device 704 at an access device 702 (e.g. POS location) can be described as follows. A user 706 presents his or her communication device 704 to an access device 702 to pay for an item or service. The communication device 704 and the access device 702 interact such that access data from the communication device 704 (e.g. PAN, a payment token, verification value(s), expiration date, etc.) is received by the access device 702 (e.g. via contact or contactless interface). As noted above, the communication device 704 may generate and provide the above-described cryptogram to the access device 702. The access device 702 may then determine if the cryptogram is valid or not. If it is, then the access device may transmit the transaction information to the resource provider computer 730. The access device 702 may alternatively generate an authorization request message that may be transmitted for authorization.

In some embodiments, the resource provider computer 730 may then receive the transaction information from the access device 702 via an external communication interface. The resource provider computer 730 may then generate an authorization request message that includes the information received from the access device 702 (i.e. information corresponding to the communication device 704) along with additional transaction information (e.g. a transaction amount, merchant specific information, etc.) and electronically transmits this information to a transport computer 740. The transport computer 740 may then receive, process, and forward the authorization request message to a processing network 750 for authorization.

In general, prior to the occurrence of a credit or debit-card transaction, the processing network 750 has an established protocol with each authorization computer on how the issuers transactions are to be authorized. In some cases, such as when the transaction amount is below a threshold value, the processing network 750 may be configured to authorize the transaction based on information that it has about the user's account without generating and transmitting an authorization request message to the authorization computer 760. In other cases, such as when the transaction amount is above a threshold value, the processing network 750 may receive the authorization request message, determine the issuer associated with the communication device 710, and forward the authorization request message for the transaction to the authorization computer 760 for verification and authorization. Once the transaction is authorized, the authorization computer 760 may generate an authorization response message (that may include an authorization code indicating the transaction is approved or declined) and transmit this electronic message via its external communication interface to processing network 750. The processing network 750 may then forward the authorization response message to the transport computer 740, which in turn may then transmit the electronic message to comprising the authorization indication to the resource provider computer 730, and then to the access device 720.

At the end of the day or at some other suitable time interval, a clearing and settlement process between the resource provider computer 730, the transport computer 740, the processing network 750, and the authorization computer 760 may be performed on the transaction.

FIG. 8 shows a block diagram of a building access system. FIG. 8 shows a communication device 804 operated by a user 806. The communication device 804 can interact with the access device 802 and pass access data as well as the above described cryptogram to the access device 802. The access device 802 may locally validate the received access data and/or the cryptogram or it may communicate with a remotely located authorization computer 860. The remotely located authorization computer 860 may validate that the access data and/or the cryptogram is/are authentic and may transmit a signal indicating this back to the access device 802. The access device 802 may then proceed to let the user 806 enter the building 830.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software. Any of the above mentioned entities may operate a computer that is programmed to perform the functions described herein.

Any of the software components, processes or functions described in this application may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

What is claimed is:

1. A method of conducting a transaction involving a communication device and an access device using a communication channel, the method comprising:

receiving, by the communication device from the access device via the communication channel, an information request associated with transaction level data, the transaction level data comprising data relating to application selection and/or transaction processing;

generating a random value, by the communication device;

hashing the random value to form a hashed random value;

generating, by the communication device using a cryptogram generation module in a memory in the communication device, a cryptogram by encrypting at least the transaction level data, and the hashed random value;

transmitting, by the communication device via the communication channel, the transaction level data, the hashed random value, and a tag assigned for interoperability level data to the access device, the hashed random value preceded by the tag; and transmitting, by the communication device via the communication channel, the cryptogram to the access device, wherein the access device or a remote server computer in communication with the access device validates the cryptogram before allowing the transaction to proceed, by decrypting the cryptogram to obtain the transaction level data, and the hashed random value, and comparing, the received transaction level data, and the hashed random value received from the communication device with the transaction level data, and the hashed random value obtained from the cryptogram to determine if the received cryptogram is valid; and allows the transaction to proceed if the received cryptogram is valid.

2. The method of claim 1, wherein the transaction level data is not needed for the communication device and the access device to communicate, and wherein the transaction level data allows the communication device and the access device to complete the transaction.

3. The method of claim 1, wherein the access device validates the cryptogram, and wherein the access device is programmed to reject the transaction if the access device cannot validate the cryptogram.

4. The method of claim 3, wherein, the information request is received in an application selection command, which includes selection of an application to use from a plurality of applications on the communication device.

5. The method of claim 1, wherein, the information request is received in an application selection command, which includes selection of an application to use from a plurality of applications on the communication device.

6. The method of claim 1, wherein generating the cryptogram comprises encrypting the transaction level data, and the hashed random value using an authorizing entity cryptographic key, and wherein the access device or the remote server computer uses a corresponding authorizing entity cryptographic key to validate the cryptogram.

7. The method of claim 6, wherein the authorizing entity cryptographic key and the corresponding authorizing entity cryptographic key are symmetric keys.

8. The method of claim 1, wherein the transaction level data, the hashed random value, the tag, and the cryptogram are transmitted in a single message from the communication device to the access device.

9. The method of claim 1, wherein the transaction level data comprise at least one of primary account number, a token, and/or an unpredictable number.

10. The method of claim 1, wherein the information request is in a get processing options command which includes point of sale terminal transaction data requested by the communication device.

11. The method of claim 1, wherein the communication device is a credit card, and wherein comparing is performed by the access device.

12. The method of claim 1, wherein the communication device is a card that complies with ISO/IEC 14443.

13. The method of claim 1, wherein the access device is a point of sale terminal.

14. The method of claim 13, wherein the communication device is a mobile phone.

15. The method of claim 13, wherein the communication channel is an NFC communication channel.

16. A communication device comprising:
a data processor; and
a non-transitory computer readable medium coupled to the data processor, the non-transitory computer readable medium comprising code, executable by the data processor, for implementing a method of conducting a transaction involving the communication device and an access device using a communication channel, the method comprising;
receiving, from the access device via the communication channel, an information request associated with transaction level data, the transaction level data comprising data relating to application selection and/or transaction processing;
generating a random value;
hashing the random value to form a hashed random value;
generating, by the communication device using a cryptogram generation module in a memory in the communication device, a cryptogram by encrypting at least the transaction level data, and the hashed random value,
transmitting via the communication channel the transaction level data, the hashed random value, and a tag that is assigned for interoperability level data to the access device, the hashed random value preceded by the tag; and
transmitting via the communication channel the cryptogram to the access device,
wherein the access device or a remote server computer in communication with the access device validates the cryptogram before allowing the transaction to proceed, by
decrypting the cryptogram to obtain the transaction level data, and the hashed random value, and
comparing, the received transaction level data, and the hashed random value received from the communication device with the transaction level data, and the hashed random value obtained from the cryptogram to determine if the received cryptogram is valid; and
allows the transaction to proceed if the received cryptogram is valid.

17. The communication device of claim 16, wherein, in the method, the access device validates the cryptogram, and wherein the access device is programmed to reject the transaction if the access device cannot validate the cryptogram.

18. The communication device of claim 16, wherein generating the cryptogram comprises encrypting the transaction level data, and the hashed random value using an authorizing entity cryptographic key, and wherein the access device or the remote server computer uses a corresponding authorizing entity cryptographic key to validate the cryptogram.

19. The communication device of claim 18, wherein the authorizing entity cryptographic key and the corresponding authorizing entity cryptographic key are symmetric keys.

20. The communication device of claim 16, wherein the communication device is a mobile phone.

* * * * *